United States Patent [19]

Kelber

[11] Patent Number: 4,666,104
[45] Date of Patent: May 19, 1987

[54] COMBINATION LIFT THRUST DEVICE

[76] Inventor: Charles C. Kelber, 2081 Snowden Ave., Long Beach, Calif. 90815

[21] Appl. No.: 757,387

[22] Filed: Jul. 22, 1985

[51] Int. Cl.$^4$ .............................................. B64C 15/00
[52] U.S. Cl. .................................. 244/12.1; 244/209; 244/15; 244/55; 239/265.19; 239/559; 239/567
[58] Field of Search ................... 244/12.1, 208, 15, 55, 244/73 R, 74, 209, 12.6; 239/265.11, 265.19, 559, 567

[56] References Cited

U.S. PATENT DOCUMENTS

| | | | |
|---|---|---|---|
| Re. 23,105 | 4/1949 | Stalker | 244/15 |
| 1,868,832 | 7/1932 | Henter et al. | 244/209 |
| 2,684,817 | 7/1954 | Roy | 244/15 |
| 2,885,162 | 5/1959 | Griswold | 244/15 |
| 2,925,231 | 2/1960 | Pfaff | 244/209 |
| 2,988,302 | 6/1961 | Smith | 244/209 |
| 3,055,614 | 9/1962 | Thompson | 244/15 |
| 3,097,817 | 7/1963 | Towzey | 244/15 |
| 3,251,552 | 5/1966 | Ford | 239/265.11 |
| 4,311,291 | 1/1982 | Gilbertson et al. | 244/211 |

FOREIGN PATENT DOCUMENTS 787013 11/1957 United Kingdom ................... 244/15

OTHER PUBLICATIONS

F. R. Etchberger et al., LFC Leading Edge Glove Flight, NASA CR172136, Nov. 1983, Abstract and pp. 1-3, 7, 50, 101, 105.
L. B. Lineberger et al., Development of Laminar Flow Control Wing Surface Composite Structures, NASA CR172330, May 1984, Abstract and pp. 11, 56.
Lockheed-Georgia and NASA-Langley, Advertisement, "Laminar Flow Control".
McDonnel-Douglas, Advertisement, Aeronautics & Astronautics, Mar., 1983.

Primary Examiner—Joseph F. Peters, Jr.
Assistant Examiner—Lynn M. Fiorito
Attorney, Agent, or Firm—James E. Brunton

[57] ABSTRACT

A combination lift and thrust device for increasing the performance of an aircraft by simultaneously reducing drag and augmenting the thrust of a turbojet engine carried within the device. The device comprises a wing of generally airfoil shape having numerous geometrically spaced apertures penetrating its surface, a turbojet engine carried within the wing, an elongated exhaust plenum attached to the turbojet having a number of strategically positioned exhaust nozzles, and a mixing chamber having a forward opening and a rear nozzle also carried within the wing. The mixing chamber forward opening is cooperatively associated with the exhaust nozzles to form an ejector drawing air through the apertures in the wing into the forward opening, mixing the air with the exhaust gases from the turbojet to provide thrust augmentation, and exhausting the air and gas mixture from the rear nozzle of the mixing chamber. The air drawn through the apertures in the wing surface reduces the turbulent boundary layer on the wing thus reducing the aerodynamic drag of the wing.

16 Claims, 8 Drawing Figures

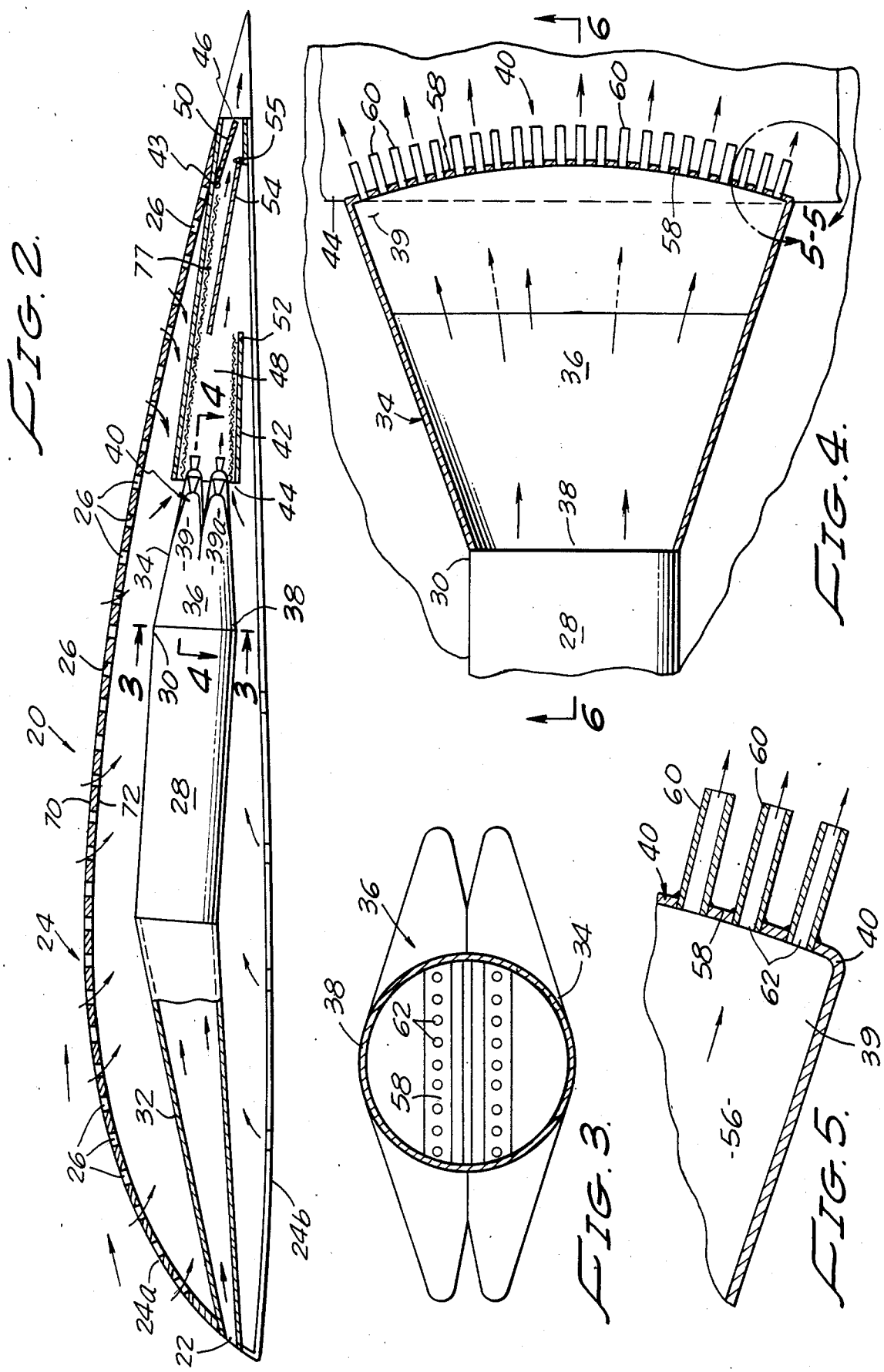

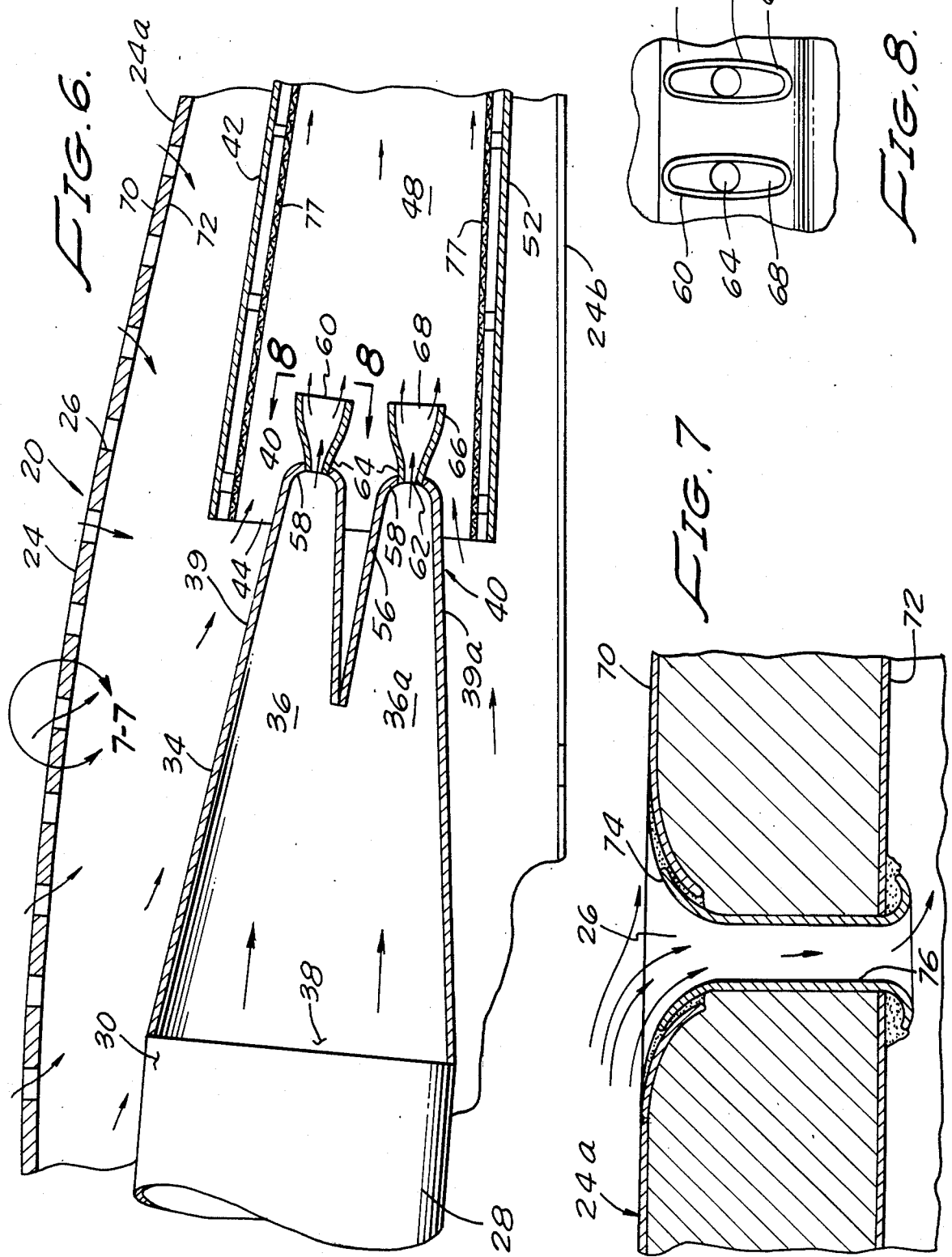

COMBINATION LIFT THRUST DEVICE

BACKGROUND OF THE INVENTION

1. Field of the Invention

The present invention relates generally to the use of boundary layer control for reduced drag on an airfoil shaped wing in combination with augmentation of thrust from a turbojet engine to improve the performance of an aircraft. The increase in performance of an aircraft by reduction of drag and the augmentation of thrust is accomplished specifically in the present invention by the combination of a ventilated wing and an ejector arrangement. The ejector uses the exhaust gases from a turbojet engine carried within the wing to draw air from the boundary layer through the wing, mix the air with the exhaust gases in a mixing chamber, and then exhaust the mixture from the wing thereby providing augmented thrust. Drawing of the air from the boundary layer reduces the drag produced by the wing thereby accomplishing a unique double benefit.

2. Discussion of the Prior Art

Development of boundary layer control devices has been pursued for a number of years. The technique of drawing air from the boundary layer to reduce drag on an aerodynamic shape has been demonstrated using a number of devices. Recently the primary approach for drawing air from the boundary layer has been to provide many very small holes on the surface of the wing or other aerodynamic shape and mechanically pump the air from the surface of the wing.

Current designs to accomplish this technique involve complex ducting techniques to provide airflow from the surface of the wing to the pump adding significant weight to the aircraft. The use of a mechanical or electrical pump requires the use of energy from the aircraft engines. The trade-off of additional weight, power usage, and complexity of the aircraft structure to provide boundary layer control and reduced drag has to date been unattractive for commercial practice.

In addition, the use of a very large number of microfine holes in the wing has distinct disadvantages due to the potential for plugging of the holes and the resultant degradation of performance.

Turbojet engines have been in commercial use for powering of aircraft for a number of years. These engines have been markedly improved over their period of use to provide added thrust and improved fuel consumption. New developments in higher temperature turbine components, increased pressure ratio and engine design technology continue this trend.

Augmentation of thrust for current jet engines takes numerous forms. The primary technique is the use of a high by-pass ratio. The turbojet engine drives a large primary fan which provides first stage compression for the turbojet using a fraction of the air driven through it while the majority of the air by-passes the turbine for direct exhaust and propulsive thrust addition to the direct jet thrust of the turbojet. It has been demonstrated that significant gains in propulsive efficiency are made using this technique.

SUMMARY OF THE INVENTION

The invention is a combination lift and thrust device comprising a wing of generally airfoil shape having numerous geometrically spaced apertures penetrating its surface, one or more low or zero by-pass turbojet engines carried within the wing, an elongated exhaust plenum attached to the turbojet having a number of strategically positioned exhaust nozzles, and a mixing chamber having a forward opening and a rear nozzle also carried within the wing. The mixing chamber forward opening is cooperatively associated with the exhaust nozzles to form an ejector drawing air through the apertures in the wing into the forward opening, mixing the air with the exhaust gases from the turbojet to provide thrust augmentation, and exhausting the air and gas mixture from the rear nozzle of the mixing chamber. The air drawn through the apertures in the wing surface reduces the turbulent boundary layer on the wing thus reducing the aerodynamic drag of the wing.

The combination of the various components of the invention provide a synergistic result of thrust augmentation and drag reduction from a single design.

One novel aspect of the current invention is the use of the multiple nozzle exhaust plenum as a multi-jet ejector in combination with the mixing chamber for turbulent boundary layer air removal and thrust augmentation. The invention provides the thrust augmentation achievable in a high by-pass turbojet engine or better with the added benefit of boundary layer control for reduced drag. Combustion of fuel-rich turbine exhaust (when turbines become operational at stochimetric mixture temperatures) in the oxygen-rich suction air drawn through the wing for reheat in the mixing chamber allows additional thrust augmentation.

The use of many small supersonic nozzles in the exhaust plenum provides a high mixing rate for the air and exhaust gases in the relatively short length of the mixing chamber. Mounting of the engine, exhaust plenum with nozzles, and the mixing chamber within the wing allows for simplified structural design.

An added benefit is obtained with the use of the multijet ejector and mixing chamber propulsion technique of the invention. A mesh or perforated sheet lining of the mixing chamber combines with the buried installation within the wing to provide significant noise reduction from the present objectionable levels of conventional propulsion techniques for aircraft. Use of the lining provides resonant absorption of acoustic energy thus converting that energy to increased thrust. The higher frequency sound generated by the multiple small exhaust nozzles of the exhaust plenum is more rapidly attenuated naturally in air than the lower frequency sound produced by normal turbojet engines thus further reducing the objectionable noise produced by a jet aircraft.

The wing itself is also a distinct component of the invention. It comprises an airfoil of thick cross section having a ventilated membrane skin. Unlike prior art ventilated wings the apertures in the wing of the present invention are large, approximately ¼ inch to 2 inches in diameter thus precluding occlusion. Exact diameter and spacing of the apertures is based on ejector pumping power, wing loading, suction pressure, external chordwise pressure gradient, and design values for flight speed and altitude.

The apertures in the wing are comprised of depressions in the outer surface of the wing and tubes feeding air through the wing skin. The depressions or dimples in the outer surface have the shape of an irrotational vortex to provide interference with transfer of momentum from the surface to the airflow over the wing. The removal of the low velocity air in the boundary layer zone of transition from laminar to turbulent, collected by the depressions, prevents the transfer of significant momentum and energy to the turbulent wake produced by the wing while creating lift. Removal of this boundary layer air thus reduces the parasite drag of the wing. Removal of the air is obtained by entrainment of the air into the ejector arrangement of the exhaust plenum nozzles and mixing chamber. An open structural design of the wing allowing direct airflow from the wing apertures to the ejector is employed.

The turbojet engine used in the invention will provide optimum results when designed to provide turbine inlet temperatures of 2000 degrees F. or greater at the inlet to the high pressure turbine and engine pressure ratios of five or more at sea level. A potential design for the improvement of these design parameters incorporates cooling the rotating hot section components with methane gas at low temperature ($-150$ degrees F.) and cooling the stationary hot section components with a high-temperature thermal transport fluid exchanging its heat to the low temperature air within the skin membrane honeycomb structure. The methane vapor could then be used for entrained air reheat in conjunction with the fuel-rich turbine exhaust reheat discussed above.

The invention also provides for variation of the exit area of the rear nozzle of the mixing chamber for optimized propulsive efficiency at various altitudes and speeds. In addition the invention provides for partial or total diversion of the air-gas mixture from the rear nozzle of the mixing chamber out the bottom of the mixing chamber. This feature facilitates the the potential use of the propulsive thrust of the turbojet engine for air cushion suspension devices for use on an aircraft employing the invention.

It is an objective of the invention to extend the payload-range envelope of an aircraft employing the invention by a factor of two or more, by combination of propulsion efficiency gains, lift-drag ratio improvement, and reduction of structural weight ratio.

It is another objective of the invention to extend the speed-altitude envelope of such an aircraft by increasing cruise altitude by 10,000 feet and reducing take-off and landing speeds to the order of 40 to 60 knots, resulting in reduction of take-off and landing distance by a factor of ten.

It is yet another objective of the invention to provide the capability for air-cushion ground operations of an aircraft employing the invention and the elimination of conventional landing gear on such an aircraft.

It is still another object of the invention to reduce sound pressure levels incidental to operation of an aircraft by a factor of 1000 to 100,000, depending on proximity.

It is a further object of the invention to incorporate the foregoing characteristics in a configuration differing greatly from the typical transport aircraft.

BRIEF DESCRIPTION OF THE DRAWINGS

FIG. 2 is a cross sectional view taken along lines 2—2 of FIG. 1.

FIG. 3 is a rearward looking cross-sectional view of the exhaust plenum taken along lines 3—3 of FIG. 2.

FIG. 4 is an enlarged fragmentary cross-sectional view of the exhaust plenum taken along lines 4—4 of FIG. 2.

FIG. 5 is an enlarged fragmentary cross-sectional view of the exhaust nozzles of the exhaust plenum in the area 5—5 shown in FIG. 4.

FIG. 6 is a fragmentary cross-sectional view taken along lines 6—6 of FIG. 4 showing the wing membrane and apertures, the exhaust plenum and its interface with the mixing chamber forward opening, and the configuration of the exhaust nozzles of this embodiment of the invention.

FIG. 7 is a greatly enlarged fragmentary view of the wing membrane and one aperture therein as shown in the area 7—7 of FIG. 6.

FIG. 8 is a fragmentary rear view of the exhaust nozzles taken along lines 8—8 of FIG. 6.

DETAILED DESCRIPTION OF THE INVENTION

Figure 1:
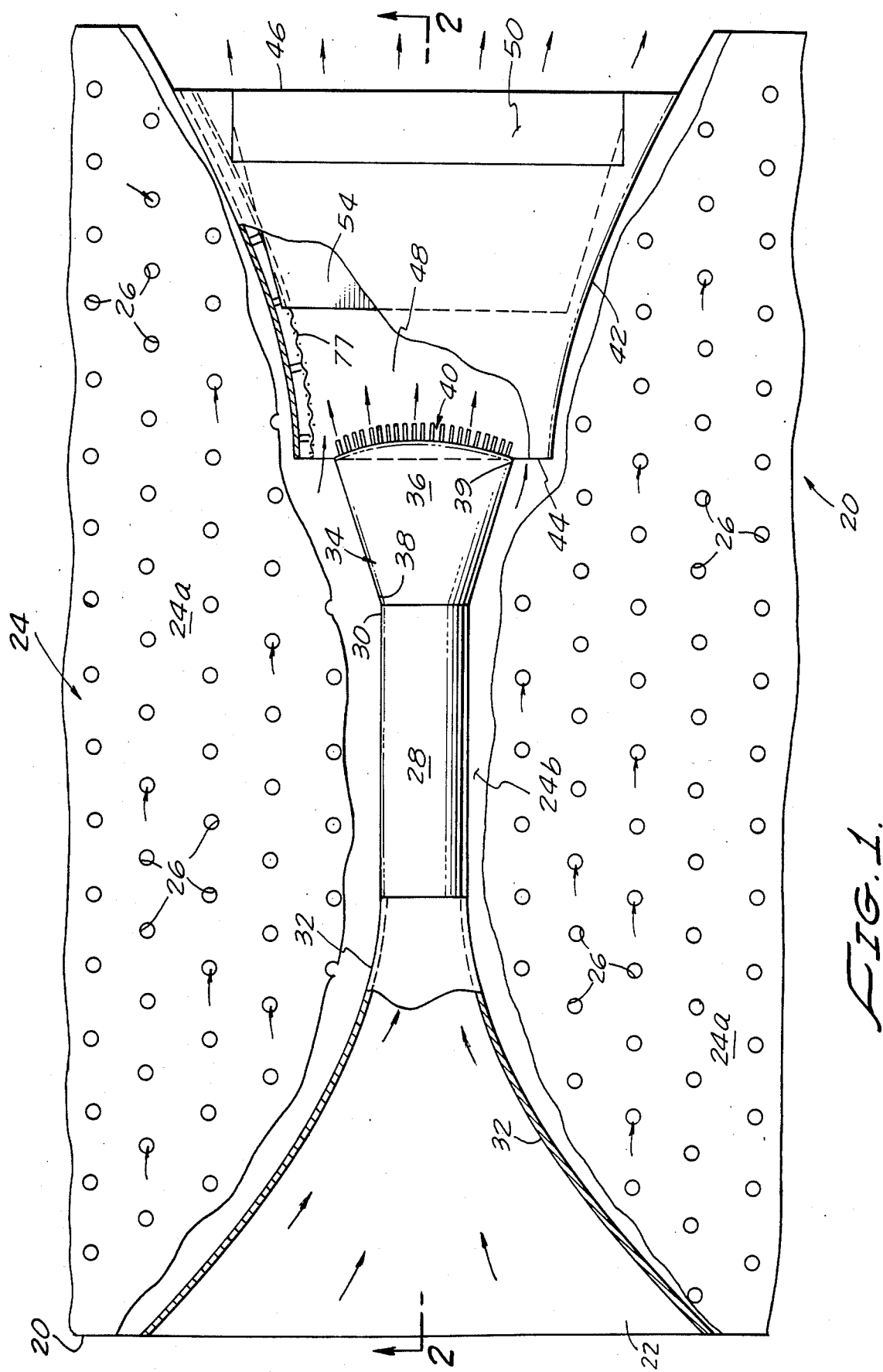
FIG. 1 is a fragmentary top view of the device of the invention showing a section of the apertured wing and being broken away to show internal construction.

Referring to the drawings and particularly to FIGS. 1 and 2, one form of the invention is there shown comprising a hollow wing 20 of general airfoil shape for providing lift as the device is moved forwardly through the air. The wing 20 includes a forward opening 22 and a membrane 24 having upper and lower surfaces 24a and 24b defining the airfoil shape. A multiplicity of spaced apart apertures 26 extend through the membrane and are constructed and arranged to permit a flow of substantial amounts of air through the membrane 24. The membrane 24 can be constructed of a number of suitable lightweight structural materials. In the present embodiment of the invention an aluminum or alithilite honeycomb sandwich material bounded by internal and external aluminum sheeting is used. The permeable sandwich material may be pressurized with air between the external and internal surfaces.

At least one turbojet engine 28 of conventional design is carried within the wing. The engine has an exhaust duct 30 for exhaustion of the gases of combustion from the engine and an inlet duct 32 communicating with the forward opening 22 in the wing 20. The details of the internal construction of the turbojet engine are well known to those skilled in the art and form no part of the present invention. Therefore, the details of the design and construction of the engine will not be discussed herein.

As shown in FIGS. 1, 2 and particularly in FIG. 6, an elongated exhaust plenum 34 including a hollow body portion 36 is interconnected proximate the forward extremity 38 thereof with the engine exhaust duct 30. The exhaust plenum 34 may be constructed of stainless steel, titanium, aluminum or other suitable material which may incorporate a thermal transport fluid cooling jacket, and is provided proximate its rearward extremity 39 with a nozzle means 40 for receiving the gases of combustion from the engine 28 and rearwardly ejecting the gases at high velocity imparting maximum turbulence to the flow of the gases.

A mixing chamber 42 carried within the wing proximate the ehaust plenum 34 is provided. The mixing chamber 42 has a forward opening 44 and a rearward opening 46. As shown best in FIGS. 1, 2 and 6 the forward opening 44 is adapted to receive the gases of combustion being ejected by the nozzle means 40 and at the same time is adapted to receive and intermix with the gases of combustion, air flowing through the apertures 26 in the membrane 24 of the wing 20.

The mixing chamber 42 is provided with control means to be presently described for controlling the flow of the mixture of air and gases of combustion rearwardly through the rearward opening 46.

The forward opening 44 of the the mixing chamber 42 is generally elliptical in cross-section and the rearward opening 46 is generally rectangular in cross-section. The mixing chamber includes a mixing section 48 which has a configuration to blend from the elliptical cross-section of the forward opening 44 to the rectangular cross-section of the rearward opening 46. The mixing section 48 and rearward opening 46 are adapted to function as a simple rectangular convergent subcritical nozzle.

The previously mentioned control means comprises a first means for altering the flow area of the rearward opening 46 of the mixing chamber 42, and a second means for controllably diverting the flow of the mixture of air and gases of combustion from the rearward opening 46 of the mixing chamber 42.

As shown in FIGS. 1 and 2, in this form of the invention the first means comprises a flap 50 hingedly attached to the mixing chamber 42 for pivotal movement about a pivot rod 43. The flap 50 is movable to a plurality of positions partially restricting the rearward opening 46 of the mixing chamber 42.

In the form of the invention here shown the second means for controllably diverting the flow of the mixture of air and gases of combustion from the rearward opening 46 of the mixing chamber 42 comprises a bottom 52 of the mixing chamber having a section 54 pivotally movable about a pivot rod 55 into the mixing chamber 42 to a plurality of positions thereby diverting varying amounts of the airflow from the rearward opening 46 through the bottom 52 of the mixing chamber 42.

The forward extremity 38 of the exhaust plenum 34 is preferably generally circular in cross-section, as best seen in FIG. 3. The hollow body portion 36 diverges horizontally and converges vertically from the forward extremity 38 to form a rearward section 56 which in cross-section is preferably in the shape of a highly eccentric ellipse.

The rearward section 56 of the hollow body portion 36 of the exhaust plenum 34 is closed by an apertured closure plate 58. The nozzle means 40 comprises a plurality of spaced apart exhaust nozzles 60 mounted within the apertures 62 of the closure plate 58.

As best seen in FIGS. 4 and 6, in this embodiment of the invention the closure plate 58 defines a semi-ellipse in a first plane and a catenary in a second, perpendicularly extending plane.

In the present form of the invention the hollow body portion 36 of the exhaust plenum 34 is bifurcated about the horizontal diameter of the circular forward extremity 38 of the exhaust plenum 34 into and upper and lower portion 36 and 36a each diverging horizontally and converging vertically from the forward extremity 38 to an upper and lower rearward section 39 and 39a each of which in cross-section is in the shape of a highly eccentric ellipse. The upper and lower rearward sections 39 and 39a each have a closure plate 58 having a plurality of spaced apart apertures 62. The nozzle means of the exhaust plenum 34 comprises exhaust nozzles 60 inserted into said apertures 62 in the closure plates 58.

In the present embodiment of the invention the exhaust nozzles 60 each comprise a supersonic nozzle. As best seen in FIGS. 6 and 8 each of the exhaust nozzles 60 also includes a tubular throat portion 64, a main body portion 66 extending rearwardly from the tubular throat 64 and an outlet portion 68. The main body portion 66 becomes rearwardly increasingly elliptical in cross-section and the outlet portion 68 is generally elliptical in cross-section.

In the form of the invention here shown, the major axes of the main body portion 66 and the outlet portion 68 are perpendicular to the major axis of the upper and lower rearward sections 39 and 39a of the exhaust plenum 34.

In the present embodiment of the invention, as best shown in FIGS. 2 and 6, the wing membrane 24 has outer and inner surfaces 70 and 72. The apertures 26 in the membrane 24 comprise a depression 74 (FIG. 7) into the outer surface 70 of the membrane 24. A tube 76 attaches to the depression 74 and extends through the membrane 24 to the inner surface 72 in the manner shown in FIG. 7.

In the form of the invention shown the depression 74 has the shape of an irrotatonal vortex.

The mixing chamber 42 is here provided with a mesh lining 77 as best seen in FIGS. 1, 2 and 6. Alternate embodiments of the invention could use perforated sheet in place of the mesh lining.

In the form of the invention shown, the major axis of the outlet portion 68 of the exhaust nozzles 62 can range from two to five times the diameter of the tubular throat portion 64.

Also in the current embodiment of the invention the diameters of the apertures 26 in the wing membrane 24 can vary from between about ¼ inch to about 2 inches and the apertures 26 can be spaced from about 2 inches to about 10 inches apart. As previously discussed, the diameters and spacing of the apertures vary depending upon ejector pumping power, wing loading, suction pressure, external chord-wise pressure gradient and other design values.

In operation as the device moves through the air, air is drawn into the hollow wing through apertures 26 in the manner shown by the arrows in FIG. 2. The air flows through the flowpath defined by the membrane 24 is drawn into the forward opening 44 of the mixing chamber 42. The air is then mixed with gases of combustion flowing from the turbojet engine 28 which are ejected with high turbulence from the exhaust nozzles 60. Mixing of the air and combustion gases is accomplished in the mixing section 48. The mixture is then exhausted through the rear opening 46 of the mixing chamber 42 which functions as a simple convergent rectangular nozzle as discussed above.

The drawing of the air through the apertures 26, along with the effects of the depressions 74 which are designed therein, reduces the turbulent boundary layer of air passing around the wing 20 thereby reducing drag. Mixing of the air in the mixing chamber 42 provides thrust augmentation for the turbojet engine 28 thereby accomplishing the second benefit of the invention.

The flap 50 provides control of the effective area of the rearward opening 46 of the mixing chamber 42 thereby maintaining the efficiency of the subcritical nozzle at varying airspeeds and altitudes.

The pivotally movable section 54 of the bottom 52 of the mixing chamber 42 is positionable within the mixing chamber 42 to divert none, some or all of the air and combustion gases mixture from the rearward opening 46 for use in air cushioning techniques to eliminate landing gear or other potential beneficial uses for operation of the aircraft.

The present invention can be used on wings of varying shape and size. Multiple turbojet engines may be used to achieve needed thrust and efficient operation.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An improved combination lift and thrust device for use in aircraft application, comprising:
    (a) a wing of general airfoil shape for providing lift as the device is moved forwardly through the air, said wing including a forward opening and a membrane having a plurality of spaced apart apertures therethrough so constructed and arranged as to permit a flow of substantial amounts of air through said membrane;
    (b) a turbojet engine carried within said wing, said engine having an exhaust duct for the exhaustion of the gases of combustion from said engine and an inlet duct communicating with said forward opening in said wing;
    (c) an elongated exhaust plenum, including a hollow body portion diverging horizontally and converging vertically from the forward extremity to the rearward extremity of said hollow body portion, said hollow body portion interconnected proximate the forward extremity thereof with said engine exhaust duct and being provided proximate the rearward extremity thereof with a closure plate having a plurality of apertures and a plurality of spaced apart exhaust nozzles mounted within the apertures of said closure plate for receiving the gases of combustion from said engine and rearwardly ejecting said gases at high velocity imparting maximum turbulence to the flow of said gases; and
    (d) a mixing chamber carried within said wing proximate said exhaust plenum, said mixing chamber having a forward opening and a rearward opening, said forward opening being adapted to receive the gases of combustion being ejected by said exhaust nozzles and at the same time being adapted to receive and intermix with said gases of combustion the air flowing through said apertures in said membrane of said wing whereby the close proximity of adjacent turbulent gas jets formed by said plurality of nozzles increases efficiency of entrainment and mixing of said gases of combustion and air in the short length of the mixing chamber increasing substantially the efficiency of the ejector formed by said mixing chamber.

2. A device as defined in claim 1 in which said forward opening of said mixing chamber is generally elliptical in cross-section, in which said rearward opening is generally rectangular in cross-section, said mixing chamber including a mixing section having a configuration which blends from the elliptical cross-section of said forward opening to the rectangular cross-section of said rearward opening, whereby said rearward opening is adapted to function as a simple rectangular convergent subcritical nozzle.

3. A device as defined in claim 2 in which said mixing chamber is provided with a control means for controlling the flow of the mixture of air and gases of combustion comprising:
    (a) a first means for altering the geometry of said rearward opening of said mixing chamber thereby changing the characteristic of the rectangular convergent subcritical nozzle; and
    (b) second means for controllably diverting the flow of the mixture of air and gases of combustion from said rearward opening, or subcritical nozzle of said mixing chamber.

4. A device as defined in claim 3 wherein said means for altering the geometry of said rearward opening of said mixing chamber comprises a flap hingedly attached to said mixing chamber, said flap movable to a plurality of positions partially restricting said rearward opening of said mixing chamber.

5. A device as defined in claim 3 wherein said means for controllably diverting air flow from said rearward opening comprises a bottom of said mixing chamber having a section pivotally movable into said mixing chamber to a plurality of positions thereby diverting varying amounts of the airflow from said rearward opening through said bottom of said mixing chamber.

6. A device as defined in claim 1 in which said forward extremity of said hollow body portion of said exhaust plenum is generally circular in cross-section and in which said hollow body portion diverges horizontally and converges vertically from said forward extremity to form a rearward section which in cross-section is in the shape of a highly eccentric ellipse.

7. An improved combination lift and thrust device for use in aircraft application, comprising:
    (a) a wing of general airfoil shape for providing lift as the device is moved forwardly through the air, said wing including a forward opening and a membrane having a plurality of spaced apart apertures therethrough so constructed and arranged as to permit a flow of substantial amounts of air through said membrane;
    (b) a turbojet engine carried within said wing, said engine having an exhaust duct for the exhaustion of the gases of combustion from said engine and an inlet duct communicating with said forward opening in said wing;
    (c) an elongated exhaust plenum, including a hollow body portion bifurcated about the horizontal diameter of of the forward extremity of said hollow body portion into an upper and lower portion each diverging horizontally and converging vertically from said forward extremity to an upper and lower rearward section, each of which in cross-section is in the shape of a highly eccentric ellipse, said upper and lower rearward sections each having a closure plate which in cross-section describes a semi-ellipse in a first plane and a catenary in a second perpendicular plane, each of said closures having a plurality of spaced apart apertures and a plurality of spaced apart nozzle means mounted within the apertures of said closure plate for receiving the gases of combustion from said engine and rearwardly ejecting said gases at high velocity imparting maximum turbulence to the flow of said gases; and
    (d) a mixing chamber carried within said wing proximate said exhaust plenum, said mixing chamber having a forward opening and a rearward opening, said forward opening being adapted to receive the gases of combustion being ejected by said nozzle means and at the same time being adapted to receive and intermix with said gases of combustion the air flowing through said apertures in said membrane of said wing.

8. A device as defined in claim 7 wherein said nozzle means comprises a plurality of supersonic nozzles inserted within said apertures in said closure plates.

9. A device as defined in claim 8 in which each of said supersonic nozzles includes:
 (a) a tubular throat adapted to be received in one of said apertures in said closure plate;
 (b) a main body portion extending rearwardly from said tubular throat, said main body portion becoming rearwardly increasingly elliptical in cross-section; and
 (c) an outlet portion, said outlet portion being generally elliptical in cross-section.

10. A device as defined in claim 9 wherein the major axis of said main body and outlet portion are perpendicular to the major axis of said upper and lower rearward portions of said exhaust plenum.

11. A device as defined in claim 7 wherein said wing membrane has inner and outer surfaces, said membrane penetrated by said apertures, said apertures comprising:
 (a) a depression into said outer surface of said membrane; and
 (b) a tube attaching to said depression and extending through said membrane to said inner surface.

12. A device as defined in claim 11 wherein said depression has an irrotational vortex shape.

13. An improved combination lift and thrust device for use in aircraft applications, comprising:
 (a) a wing of general airfoil shape, having an upper and lower surface, a forward opening, a membrane having inner and outer surfaces, said membrane penetrated by a plurality of spaced apertures comprising:
  (i) an irrotational vortex shaped depression in said outer surface; and
  (ii) a tube attaching to said depression and extending through said membrane to said inner surface;
 (b) a turbojet engine carried within said wing, having an inlet duct communicating with said forward opening in said wing, and an exhaust duct for the exhaustion of the gases of combustion from said engine;
 (c) an elongated exhaust plenum interconnected proximate the forward extremity thereof with said exhaust duct of said turbojet engine, said plenum having a hollow body portion and said forward extremity having circular cross-section, said hollow body portion bifurcated about the horizontal diameter of said forward extremity into an upper and lower portion, said upper and lower portions diverging horizontally and converging vertically from said forward extremity to an upper and lower rearward section each of which in cross-section is in the shape of a highly eccentric ellipse, said upper and lower rearward sections each having a closure plate which in cross-section describes a semi-ellipse in a first plane and a catenary in a second perpendicular plane, each of said closure plates having a plurality of spaced apart apertures through which are inserted a plurality of supersonic nozzles for receiving the gases of combustion form said engine and rearwardly ejecting said gases at high velocity imparting maximum turbulence to the flow of said gases, each of said nozzles having:
  (i) a tubular throat portion adapted to be received in one of said apertures in said closure plate;
  (ii) a main body portion extending rearwardly from said tubular throat, said main body portion becoming rearwardly increasingly elliptical in cross-section; and
  (iii) an outlet portion, said outlet portion being generally elliptical in cross-section, the major axis of said main body portions and said outlet portions perpendicular to the major axis of said upper and lower rearward sections of said plenum;
 (d) a mixing chamber carried within said wing proximate said supersonic nozzles, said mixing chamber having:
  (i) a forward opening of elliptical cross-section and a rearward opening of rectangular cross-section, said forward opening adapted to receive the gases of combustion being ejected by said supersonic nozzles and at the same time being adapted to receive and intermix with said gases of combustion the air flowing through said apertures in said membrane of said wing, said mixing chamber having a mixing section having a configuration which blends from the elliptical cross-section of said forward opening to the rectangular cross-section of said rearward opening whereby said rearward opening is adapted to function as a simple rectangular convergent subcritical nozzle;
  (ii) a flap hingedly attached to said mixing section, said flap movable to a plurality of positions partially restricting said rearward opening; and
  (iii) a bottom of said mixing chamber having a section pivotally movable into said mixing chamber to a plurality of positions thereby diverting varying amounts of the mixture of air and gases of combustion from said rearward opening of said mixing chamber through said bottom of said mixing chamber; and
 (e) flow means for conducting diverted air and exhaust gas mixture from said mixing chamber.

14. A device as defined in claim 13 wherein said mixing chamber further comprises a mesh lining affixed within said mixing chamber.

15. A device as defined in claim 13 wherein said major axis of said outlet portion of said supersonic nozzles is two to five times the diameter of said tubular throat.

16. A device as defined in claim 13 wherein said apertures in said wing membrane have diameters from ¼ inch to 2 inches and are spaced from 2 inches to 10 inches apart.

* * * * *